United States Patent
Jain et al.

(10) Patent No.: US 10,936,711 B2
(45) Date of Patent: Mar. 2, 2021

(54) SYSTEMS AND MECHANISM TO CONTROL THE LIFETIME OF AN ACCESS TOKEN DYNAMICALLY BASED ON ACCESS TOKEN USE

(71) Applicant: Intuit Inc., Mountain View, CA (US)

(72) Inventors: Parul Jain, Bangalore (IN); Doug Foiles, San Diego, CA (US); Erik Peterson, San Diego, CA (US)

(73) Assignee: Intuit Inc., Mountain View, CA (US)

(*) Notice: Subject to any disclaimer, the term of this patent is extended or adjusted under 35 U.S.C. 154(b) by 643 days.

(21) Appl. No.: 15/490,015

(22) Filed: Apr. 18, 2017

(65) Prior Publication Data

US 2018/0300471 A1    Oct. 18, 2018

(51) Int. Cl.
| | | |
|---|---|---|
| *G06F 21/45* | (2013.01) | |
| *G06F 21/62* | (2013.01) | |
| *H04W 12/00* | (2021.01) | |
| *H04L 29/06* | (2006.01) | |
| *H04W 12/08* | (2021.01) | |

(52) U.S. Cl.
CPC .......... *G06F 21/45* (2013.01); *G06F 21/6218* (2013.01); *H04L 63/105* (2013.01); *H04L 63/108* (2013.01); *H04W 12/00502* (2019.01); *H04W 12/0804* (2019.01)

(58) Field of Classification Search
USPC .......... 726/28, 2, 21, 36; 713/150, 163, 181; 380/255, 264, 276
See application file for complete search history.

(56) References Cited

U.S. PATENT DOCUMENTS

| | | | |
|---|---|---|---|
| 5,003,596 | A | 3/1991 | Wood |
| 6,157,723 | A | 12/2000 | Schultz |

(Continued)

FOREIGN PATENT DOCUMENTS

| | | |
|---|---|---|
| EP | 0906677 | 1/1998 |
| EP | 1501256 | 1/2005 |

(Continued)

OTHER PUBLICATIONS

Tokuyoshi, "Encryption: Getting a Grip on Key Rotation", Apr. 23, 2009, pp. 1-3. Retrieved from the internet. <http://www.cio.com/article/2428777/security0/encryption--getting-a-grip-on-key-rotation.html>.

(Continued)

*Primary Examiner* — Sharif E Ullah
(74) *Attorney, Agent, or Firm* — Paradice and Li LLP

(57) ABSTRACT

A data management system manages secured data for a plurality of users. The data management system utilizes an access authorization system to authenticate users seeking access to the data management system. The access authorization system provides access tokens to authenticated users. The access tokens enable the authenticated users to access the data management system without again providing authentication data. The access authorization system includes, for each user, an access policy that governs whether the users can use the access tokens to access the data management system. The access tokens have a finite lifetime. If the users use the access tokens within the finite lifetime and if the users satisfy all of the access rules of the access policies, then the lifetime of the access tokens can be extended a finite number of times.

18 Claims, 4 Drawing Sheets

(56) References Cited

U.S. PATENT DOCUMENTS

| | | |
|---|---|---|
| 6,324,648 B1 | 11/2001 | Grantges, Jr. |
| 6,889,210 B1 | 5/2005 | Vainstein |
| 6,981,041 B2 | 12/2005 | Araujo et al. |
| 6,996,716 B1 | 2/2006 | Hsu |
| 7,178,033 B1 | 2/2007 | Garcia |
| 7,336,790 B1 | 2/2008 | Caronni et al. |
| 7,360,075 B2 | 4/2008 | VanHeyningen et al. |
| 7,380,120 B1 | 5/2008 | Garcia |
| 7,434,045 B1 | 10/2008 | Enderwick et al. |
| 7,546,629 B2 | 6/2009 | Albert et al. |
| 7,568,235 B2 | 7/2009 | Bird et al. |
| 7,715,565 B2 | 5/2010 | Kimmel et al. |
| 7,739,501 B2 | 6/2010 | Kimmel et al. |
| 7,890,530 B2 | 2/2011 | Bilger et al. |
| 7,983,423 B1 | 7/2011 | Agarwal et al. |
| 7,984,025 B2 | 7/2011 | Valfridsson et al. |
| 8,095,960 B2 | 1/2012 | Boogert et al. |
| 8,316,237 B1 | 11/2012 | Felsher et al. |
| 8,352,999 B1 | 1/2013 | Zhan et al. |
| 8,498,941 B2 | 7/2013 | Felsher |
| 8,560,857 B2 | 10/2013 | Munetoh et al. |
| 8,656,189 B2 | 2/2014 | Orsini et al. |
| 8,700,898 B1 | 4/2014 | Korthny et al. |
| 8,700,906 B2 | 4/2014 | Kamara et al. |
| 8,826,013 B1 | 9/2014 | Kodukula et al. |
| 8,880,882 B2 | 11/2014 | Kulkarni et al. |
| 9,282,122 B2 | 3/2016 | Cabrera et al. |
| 9,378,380 B1 | 6/2016 | Reid et al. |
| 9,384,362 B2 | 7/2016 | Cabrera et al. |
| 9,396,338 B2 | 7/2016 | Cabrera et al. |
| 9,444,818 B2 | 9/2016 | Lietz et al. |
| 9,467,477 B2 | 10/2016 | Cabrera et al. |
| 9,785,798 B1 | 10/2017 | Enderwick et al. |
| 9,900,330 B1 | 2/2018 | Dargude et al. |
| 10,095,885 B1 | 10/2018 | Enderwick et al. |
| 10,635,829 B1* | 4/2020 | Barker .................. G06F 11/34 |
| 2002/0023065 A1 | 2/2002 | Frelechoux et al. |
| 2003/0200202 A1* | 10/2003 | Hsiao ................ G06F 21/6218 |
| 2004/0210591 A1 | 10/2004 | Hirschfeld et al. |
| 2005/0138110 A1 | 6/2005 | Redlich et al. |
| 2006/0062238 A1 | 3/2006 | Mahendran et al. |
| 2006/0215839 A1 | 9/2006 | Augenstein et al. |
| 2006/0291664 A1 | 12/2006 | Suarez et al. |
| 2007/0156781 A1 | 7/2007 | Kapoor et al. |
| 2007/0195960 A1 | 8/2007 | Golman et al. |
| 2007/0276931 A1 | 11/2007 | Mahdavi et al. |
| 2008/0013569 A1 | 1/2008 | Boren |
| 2008/0072309 A1 | 3/2008 | Kleinsteiber et al. |
| 2008/0083036 A1 | 4/2008 | Ozzie et al. |
| 2008/0098392 A1 | 4/2008 | Wipfel et al. |
| 2008/0109491 A1 | 5/2008 | Gupta |
| 2008/0155649 A1 | 6/2008 | Maler et al. |
| 2008/0319909 A1 | 12/2008 | Perkins et al. |
| 2009/0092252 A1 | 4/2009 | Noll et al. |
| 2009/0103724 A1 | 4/2009 | Tamai |
| 2009/0204631 A1 | 8/2009 | Pomroy et al. |
| 2009/0287837 A1 | 11/2009 | Felsher |
| 2009/0319772 A1 | 12/2009 | Singh et al. |
| 2010/0082991 A1 | 4/2010 | Baldwin et al. |
| 2010/0145997 A1 | 6/2010 | Zur et al. |
| 2010/0146600 A1 | 6/2010 | Eldar et al. |
| 2010/0189251 A1 | 7/2010 | Curren |
| 2011/0004752 A1 | 1/2011 | Shukla |
| 2011/0022642 A1 | 1/2011 | deMilo et al. |
| 2011/0022812 A1 | 1/2011 | van der Linden et al. |
| 2011/0093707 A1 | 4/2011 | Green et al. |
| 2011/0113236 A1 | 5/2011 | Chenard et al. |
| 2011/0158406 A1 | 6/2011 | Marcia et al. |
| 2011/0188651 A1* | 8/2011 | Iswandhi ................ G06F 12/00 380/44 |
| 2011/0191595 A1* | 8/2011 | Damian .................... H04L 9/06 713/189 |
| 2011/0219035 A1* | 9/2011 | Korsunsky ............. G06F 21/00 707/784 |
| 2011/0277027 A1* | 11/2011 | Hayton ............... H04L 63/0815 726/8 |
| 2011/0321147 A1 | 12/2011 | Chakra et al. |
| 2012/0096281 A1* | 4/2012 | Eszenyi ................ H04L 9/0894 713/189 |
| 2012/0131189 A1* | 5/2012 | Smart ..................... G06F 21/64 709/225 |
| 2012/0144501 A1 | 6/2012 | Vangpat et al. |
| 2012/0185913 A1* | 7/2012 | Martinez ............ G06F 9/45558 726/1 |
| 2012/0204032 A1* | 8/2012 | Wilkins .............. H04L 63/0428 713/170 |
| 2012/0240194 A1 | 9/2012 | Nack Ngue |
| 2012/0303776 A1* | 11/2012 | Ferris ................ H04L 29/08072 709/223 |
| 2012/0304311 A1* | 11/2012 | Kline ...................... G06F 21/33 726/28 |
| 2012/0311564 A1* | 12/2012 | Khalid ................ H04L 67/1097 718/1 |
| 2013/0019284 A1* | 1/2013 | Pacyga ............. H04W 12/0804 726/4 |
| 2013/0038673 A1 | 2/2013 | Hiller et al. |
| 2013/0060825 A1* | 3/2013 | Farcasiu ................ G06F 16/25 707/812 |
| 2013/0097706 A1* | 4/2013 | Titonis ................... G06F 21/56 726/24 |
| 2013/0104213 A1* | 4/2013 | Nandakumar .......... G06F 21/31 726/7 |
| 2013/0125247 A1* | 5/2013 | Sprague .............. H04L 63/0428 726/28 |
| 2013/0185784 A1* | 7/2013 | Tamura ............... H04L 63/0853 726/9 |
| 2013/0204849 A1* | 8/2013 | Chacko ................. G06F 3/0641 707/692 |
| 2013/0219456 A1* | 8/2013 | Sharma ................. G06F 16/188 726/1 |
| 2013/0247144 A1* | 9/2013 | Marshall ................. H04L 63/10 726/1 |
| 2013/0254539 A1* | 9/2013 | Auradkar ............. G06F 21/6209 713/165 |
| 2013/0346558 A1* | 12/2013 | Khalidi ................ G06F 9/5072 709/218 |
| 2014/0007178 A1* | 1/2014 | Gillum .................. G06F 9/5077 726/1 |
| 2014/0007239 A1* | 1/2014 | Sharpe .................. G06F 16/137 726/24 |
| 2014/0026179 A1* | 1/2014 | Devarajan ............... G06F 21/56 726/1 |
| 2014/0026193 A1* | 1/2014 | Saxman ................. G06F 21/33 726/4 |
| 2014/0068732 A1* | 3/2014 | Hinton .................... G06F 21/41 726/6 |
| 2014/0074637 A1* | 3/2014 | Hammad ............. G06Q 20/227 705/21 |
| 2014/0075499 A1* | 3/2014 | Arun .................. G06F 16/2282 726/1 |
| 2014/0165134 A1* | 6/2014 | Goldschlag ....... H04W 12/0806 726/1 |
| 2014/0173699 A1 | 6/2014 | Daly et al. |
| 2014/0244585 A1* | 8/2014 | Sivasubramanian ... G06F 16/21 707/639 |
| 2014/0282840 A1* | 9/2014 | Guinan .................. H04L 63/20 726/1 |
| 2014/0283010 A1* | 9/2014 | Rutkowski ............. H04L 9/088 726/18 |
| 2014/0330869 A1* | 11/2014 | Factor ...................... G06F 9/00 707/783 |
| 2015/0256557 A1 | 9/2015 | Wong et al. |
| 2015/0263859 A1* | 9/2015 | Lietz ...................... H04L 69/18 713/168 |
| 2015/0295916 A1* | 10/2015 | Sanso .................. H04L 63/0807 726/9 |
| 2015/0310221 A1* | 10/2015 | Lietz ....................... H04L 9/16 713/193 |
| 2016/0119444 A1 | 4/2016 | Pinkovezky et al. |
| 2016/0307208 A1 | 10/2016 | Dandekar et al. |

(56) References Cited

U.S. PATENT DOCUMENTS

2016/0352741 A1* 12/2016 Caffary, Jr. ......... G06F 21/6218
2017/0359352 A1   12/2017 Ainscow
2020/0218822 A1    7/2020 Barker et al.

FOREIGN PATENT DOCUMENTS

| EP | 2469753 | 6/2012 |
| EP | 2645673 | 10/2013 |
| GB | 2477682 | 11/2009 |
| GB | 2524632 | 1/2015 |
| WO | WO 2010/144735 | 12/2010 |
| WO | WO 2013/144497 | 10/2013 |
| WO | 2014015147 A1 | 1/2014 |

OTHER PUBLICATIONS

Zao, et al.; "Domain Based Internet Security Policy Management;" DARPA Information Survivability Conference and Exposition, 2000 Proceedings; Jan. 25-27, 2000; IEEE.
Reddy et al., "Security Architecture of Cloud Computing," *International Journal of Engineering Science and Technology (IJEST)*, vol. 3, No. 9, Sep. 9, 2011, pp. 7149-7155.
Weaver et al., "Method and System for Automatically Managing Secret Application and Maintenance," U.S. Appl. No. 14/069,921, filed Nov. 1, 2013.
Supplementary European Search Report—EP18787198—European Patent Office—Munich—dated Oct. 23, 2020.

* cited by examiner

SYSTEMS AND MECHANISM TO CONTROL THE LIFETIME OF AN ACCESS TOKEN DYNAMICALLY BASED ON ACCESS TOKEN USE

BACKGROUND

Data security is rapidly becoming the most important, and potentially limiting, factor in the field of data processing. While the emergence of portable data, "cloud computing," and other forms of distributed data processing and data sharing have the potential to provide truly revolutionary and paradigm shifting advances in human activity, current methods of providing security for sensitive data introduce inefficiencies into data management systems.

For example, many traditional data management system utilize an access authorization system to provide users with an access token after users have initially provided authentication credentials such as a user name, a password, an identification number, an answer to a security question, an account number, or other types of authentication credentials. The access token enables the user to repeatedly access protected services of the traditional data management system without repeatedly providing authentication credentials. This can be very convenient to users as it allows them to access services of the data management system again and again without undergoing the hassle of providing authentication credentials.

However, the traditional use of access tokens also constitutes a security risk for data management systems. For example, traditional access authorization systems typically provide access tokens that have a long lifetime, often up to several years. In some cases, traditional access authorization systems provide access tokens that have no expiration date at all. During the lifetime of the access token, a user can access the protected services of the data management system without providing authentication credentials. Due to the long lifetime of the access tokens, there is a serious security risk associated with these access tokens. The longer the lifetime of the access token, the greater the security risk.

For example, during the long lifetime of an access token, the access token may eventually fall into the hands of fraudsters or other unauthorized individuals. If the access token has not expired, the fraudsters can utilize the access token to gain access to the protected services of the traditional data management system. This can result in serious harm to the users of the data management system and to the data management system itself if sensitive data is accessed by the fraudsters.

What is needed is a technical solution to the long standing technical problem of providing convenient access to users of data management systems while also provide strong security to sensitive data stored or protected by the data management systems.

SUMMARY

Embodiments of the present disclosure address some of the shortcomings associated with current data access security protocols by providing methods and systems that provide efficient and secure access control for data management systems. Embodiments of the present disclosure address some of the drawbacks of typical access control schemes by providing an access authorization system that can provide an access token to a user and that can automatically extend the life of the access token or terminate or deny the access token based on access policy rules related to the access token. The access authorization system controls access to protected data and services of a data management system. Embodiments of the present disclosure enable a user to initially provide authentication data to the access authorization system. If the authentication data is valid or acceptable, the access authorization system then provides access token data to the user. The access token data represents an access token that enables the user to subsequently access the protected services or data of the data management system without again providing authentication credentials. Rather than providing an access token with a very long fixed lifetime, the lifetime of the access token is based on an access token profile. The access token may have an initial relatively short expiration date or lifetime based on the access policy rules. However, the expiration date or lifetime of the access token can be selectively extended based on the actions of the user and in accordance with the access token profile. If the user accesses the data management system with the access token within a selected time period set forth by the access policy, and if the user meets other criteria set forth by the access policy, then the data management system can extend the lifetime of the access token. If the access token is not used within the initial expiration date, then the data management system denies access to the user until the user again provides authentication credentials. Thus, rather than providing a static access token with either a fixed lifetime or an indefinite lifetime, embodiments of the present disclosure provide an access token with a lifetime that can be selectively extended in relatively short amounts in accordance with an access token policy. This reduces both the risks associated with repeatedly providing sensitive authentication data and the risks associated with access tokens that never expire. Consequently, embodiments of the present disclosure provide a technical solution to the long standing technical problem of balancing security concerns associated with access tokens that have very long lifetimes, or even indefinite lifetimes, with the risks and inconvenience to users associated with requiring that the users provide authentication credentials each time they wish to access the protected services or data of the data management system.

In one embodiment, the access token policy defines how the lifetime of the access token can be extended. Each time the user accesses the data management system with the access token, the access authorization system renews or extends the lifetime of the access token in accordance with the access token policy. The access token policy can determine an amount of time by which the life access token should be extended, when to extend the life of the access token, how many times the access token can be extended, whether the access token can be extended an unlimited number of times, or other factors related to the lifetime of the access token. The access token policy can be based on the user, the type of data management system that the user uses the access token to access, whether the user is an automated process or a human, or other factors. The access policy can also dynamically adapt the access rules based on the above factors and the usage patterns of the user. In one embodiment, when the access token expires, the data management system can require that the user again provide authentication credentials to the data management system before providing the user with a new access token.

In one embodiment, the access token policy can define an initial relatively short validity period of days or weeks. If the user does not use the access token during the initial period, then the access token expires. If the user does use the access token to access the data management system, then the data management system extends the lifetime of the access token for a selected number of days or weeks in accordance with the access token policy. If the user again uses the access token during the extended lifetime of the access token, then the data management system can again extend the lifetime of the access token in accordance with the access token policy. In one embodiment, the number of days or weeks by which the lifetime of the access token is extended is equal to the initial validity period of the access token. Alternatively, the number of days or weeks by which the lifetime of the access token is extended upon use can be a different amount of time than the initial validity period. In one embodiment, the period of time by which the lifetime of the access token is extended can decrease with each renewal or extension.

In one embodiment, the access token policy defines access rules for accepting the access token and for extending the lifetime of the access token. In one embodiment, the access rules can include that the access token must be provided from an IP address that matches an IP address stored in the access token policy data. For example, when a user initially provides authentication credentials, the data management system can record in the access token policy data an IP address associated with the user. After providing an access token to the user, when the data management system receives the access token in conjunction with an attempt to access the protected services or data of the data management system, the data management system identifies an IP address associated with the request to access the protected services or data and compares the IP address to the IP address stored in the access policy data. If the IP address associated with the access request matches the IP address stored in the access policy data, and if the access token has not expired, then the data management system accepts the access token, possibly extends the lifetime of the access token, and enables the user to access the protected services or data in accordance with the access request.

In one embodiment, the access policy can also include access rules based on device identifiers related to a device of the user. For example, the user may utilize a particular device such as a mobile phone, a tablet, a laptop, a desktop computer, a virtual machine, or other types of devices in order to access the data management system. These devices can include device identifiers that identify the particular device being used. The device identifiers can include a MAC address, a machine identification number, a soft identifier that is injected into the device by the access authorization system, an operating system of the device, or other factors. When the user attempts to use the access token to gain access to the data management system, the access authorization system identifies the device identifiers associated with the device that has provided the access token. The access authorization system can compare the device identifiers of the device that has provided the access token to the device identifiers stored in the access policy. If the device identifiers indicate that the device that has provided the access token is not the same device to which the access token was first given, or that the device is not one of a limited number of authorized devices, then the access authorization system can deny access to the device based on the access policy rules.

In one embodiment, the access rules can include rules dictating that if the circumstances of the access request fall outside of typical circumstances associated with access requests, or if the access request otherwise indicates suspicious or malicious activity, then the data management system does not accept the access token. In one embodiment, if the access token is provided to the data management system at a time of day that is atypical, then the data management system can deny access based on the access token and can require that the user again provide authentication credentials before accepting the access token or issuing a new access token. For example, if the user typically accesses the data management system between 8 A.M and 10 P.M., then the data management system can identify this usage pattern and can include in the access policy rules that if future access requests occur outside of the typical timeframe, then the access token will not be accepted or extended and that the user must provide authentication credentials before the access token will be accepted or extended or before a new access token will be issued.

In one embodiment, the access rules can include rules related to the frequency with which the user uses the access token. The access authorization system may determine that the user typically uses the access token to gain access to the data management system with a frequency of once per day. The access authorization system may adjust the access rules so that if the user begins using the access token and a distinctly higher or lower frequency, then the access token may be revoked or denied, or the lifetime of the access token may not be extended. In some cases, the user may be an automated process that makes frequent access calls, for example, every hour. If the frequency of access calls begins to deviate from the recognized frequency, then the access rules may determine that the access token should no longer be renewed or accepted. Thus, the access rules can be adapted based on the type of user and the frequency with which the user uses the access token.

In one embodiment, the access policy can change its own rules based on the usage pattern, usage frequency, device identifier, time of day of access requests, or other factors. As new patterns are identified, the access policy can change or justice rules or can request that the authentication data can be provided.

In one embodiment, the authentication data can include data provided by the user to authenticate the user before receiving an access token. The authentication data can include data that might typically be provided by user to log into a system. Thus, the authentication data can include a user name, a password, an answer to a security question, a fingerprint, a retinal scan, a facial recognition scan, other kinds of biometric measurements or credentials, a pin number, a one-time pin, a security code provided in the text message or an email, or other types of authentication data. The access authorization system can require that the user provide authentication data on an initial attempt to access the data management system, prior to providing an access token to the user, after the access token has expired, if the user fails to satisfy the rules of the access policy, or under other circumstances.

In one embodiment, the access authorization system utilizes the access token policy in accordance with an OAuth standard for authorization. In one embodiment, the data management system utilizes the access token policy in accordance with an OAuth 1 standard. In one embodiment, the data management system utilizes the access token policy in accordance with an OAuth 2 standard. The access authorization system can utilize the access token policy in accordance with standards and protocols other than OAuth standards. The access authorization system can utilize the access token policies in conjunction with any other suitable standard or protocol. In one embodiment, the controls and the access controls and access policies apply to the access token entity of OAuth1 protocol and the refresh token entity of OAuth2 protocol. The access authorization system can utilize the access token policy in accordance with tokening standards and protocols other than OAuth standards.

In one embodiment, the access authorization system controls access by users to a data management system such as a financial management system, a social media system, an online personal address book, an email system, an app store at which users purchase software applications for mobile phones, tablets, or other types of computing devices, databases that control sensitive data, cloud data storage systems, or any other type of data management system that stores and/or manages data.

In one embodiment, the data management system is a financial management system. The financial management system can provide services to users by which users can manage their finances. In one embodiment, the financial management system can enable users to view and manage bank accounts, credit card accounts, financial transactions, retirement accounts, loan accounts, tax return preparation, payroll, budgeting, accounting, or other types of financial management services. The access authorization system controls access to the financial management system.

In one embodiment, the access authorization system can base the access policy rules in part on the type of data management system that the access token grants access to. For example, the financial management system may manage data that is highly sensitive such as tax data, bank account data, or other types of very sensitive personal data. In this case, the access rules may be comparatively strict. In another example, an access policy may determine access to a social media service that manages less sensitive data. In this case, the access rules may be less strict.

In one embodiment, the access authorization system utilizes the access policy to detect and defend against fraudulent activity, suspicious activity, attempts by malicious or rogue users to gain access to sensitive data, or other types of harmful activity. The access policy rules assist the access authorization system to identify these types of fraudulent activity when access requests do not satisfy all the access rules of the access policy. Thus, the access rules not only protect against unauthorized users, but the access rules can be used to learn and identify what types of access request circumstances indicate fraudulent activity, suspicious activity, or malicious activity.

The disclosed embodiments provide one or more technical solutions to the technical problem of security deficiencies and inefficiencies in data management systems by providing selectively extendable and acceptable access tokens to users of a data management system based on access policies. For example, if the user is required to repeatedly provide authentication data, the user may decide to write down authentication data for easy reference, or store the authentication data in an unsecured file on the computer so that the user can easily access and remember the authentication data. This creates a risk that the authentication data will be obtained by someone other than the user, potentially severe adverse consequences. Embodiments of the present disclosure provide technical solutions to these and other security risks. These and other embodiments of the data management system are discussed in further detail below.

Providing selectively extendable and acceptable access tokens to users of a data management system based on access policies is a technical solution to a long standing technical problem and is not an abstract idea for at least a few reasons. First, providing selectively extendable and acceptable access tokens to users of a data management system based on access policies is not an abstract idea because it is not merely an idea itself (e.g., can be performed mentally or using pen and paper). Second, providing selectively extendable and acceptable access tokens to users of a data management system based on access policies is not an abstract idea because it is not a fundamental economic practice (e.g., is not merely creating a contractual relationship, hedging, mitigating a settlement risk, etc.). Third, providing selectively extendable and acceptable access tokens to users of a data management system based on access policies is not an abstract idea because it is not a method of organizing human activity (e.g., managing a game of bingo). Fourth, although mathematics may be used in providing selectively extendable and acceptable access tokens to users of a data management system based on access policies, the disclosed and claimed methods and systems of providing selectively extendable and acceptable access tokens to users of a data management system based on access policies are not an abstract idea because the methods and systems are not simply a mathematical relationship/formula.

In addition, providing selectively extendable and acceptable access tokens to users of a data management system based on access policies is not an abstract idea because improving the security of users' data allows for significant improvement to the technical fields of data processing, fraud prevention, fraud detection, data security, electronic data management, user experience, customer service, and customer retention, according to one embodiment. The present disclosure adds significantly to the fields of electronic data security and data management because the disclosed systems and methods decrease the likelihood of security breaches, increase the likelihood that individuals and organizations will not suffer harmful real world consequences from their data being obtained and exploited by fraudsters, and decrease the inefficiencies introduced by access tokens with indefinite or otherwise unduly long lifetimes, according to one embodiment.

As a result, embodiments of the present disclosure allow for reduced usage of processor cycles, memory, and power consumption, by reducing the time and resources spent by data management systems to increase access controls and other aspects of data security. Embodiments of the present disclosure also allow for reduced monitoring and intervention by users, experts, and technicians. This adds security controls and can reduce the roles of humans and alerts and reactive measures upon fraud and suspicious activity. Such human activity can then be directed to other useful purposes, thereby improving the overall efficiency of access authorization and data management systems. Consequently, computing and communication systems implementing or providing the embodiments of the present disclosure are transformed into more operationally efficient devices and systems.

In addition to improving overall computing performance, providing selectively extendable and acceptable access tokens to users of a data management system based on access policies significantly improves the field of data management by reducing the inefficient and complex security measures undertaken to protect data. Therefore, both human and non-human resources are utilized more efficiently. Furthermore, by providing selectively extendable and acceptable access tokens to users of a data management system based on access policies, loyalty in the data management system is increased, which results in repeat customers, efficient security practices, and reduced abandonment of use of the data management system, according to one embodiment.

Figure 1:
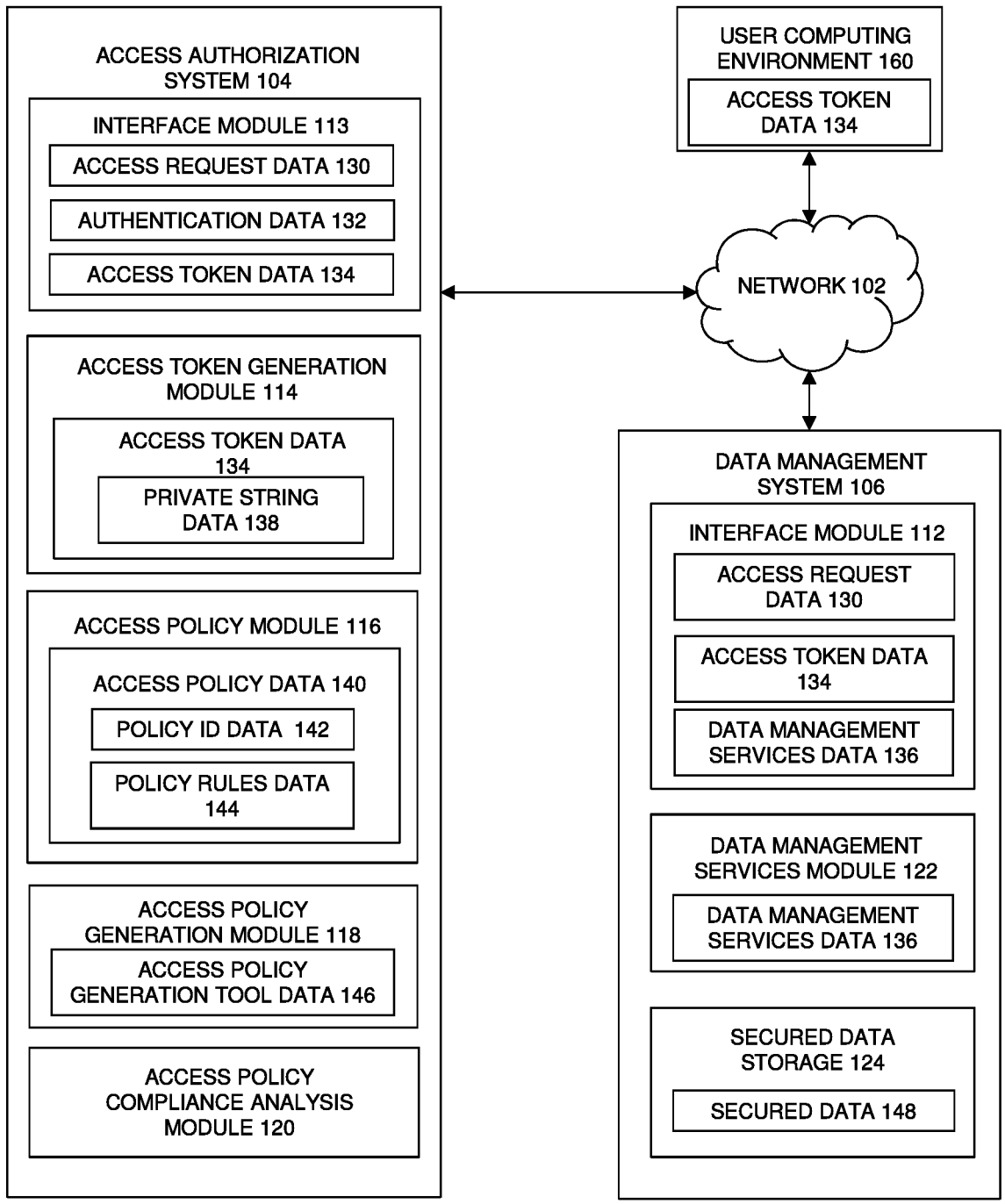
FIG. 1 is a block diagram of software architecture providing selectively extendable and acceptable access tokens to users of a data management system based on access policies, in accordance with one embodiment.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more data management systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, Transport Layer Security (TLS) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a Virtual Private Cloud (VPC); or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed system and method for providing access control and enhanced encryption determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the term file includes, but is not limited to, a data entity that is a sequence of bytes that can be accessed individually or collectively.

Hardware Architecture

FIG. 1 illustrates a block diagram of a production environment 100 for providing selectively extendable and acceptable access tokens to users of a data management system based on access policies, according to one embodiment. Embodiments of the present disclosure provide methods and systems that provide selectively extendable and acceptable access tokens to users of a data management system based on access policies, according to one embodiment. In particular, when a user of the data management system seeks to access the secured data or services of the data management system, the data management system redirects the user to an access authorization system that determines who can gain access to the data management system. The user provides access request data representing a request to access the data management system. If the access request data does not include access token data representing an access token, or if the user does not have access token data representing an access token, then the access authorization system requires the user to provide authentication data, such as a user name, a password, an identification number, answers to security questions, fingerprint scans, retinal scans, facial scans, a pin number, etc. in order to authenticate the user as an authorized user of the data management system. After the user has been authenticated as an authorized user of the data management system, in order to avoid the repeated transmission of sensitive authentication data, the access authorization system provides the user with access token data related to an access token that will enable the user to access the data management system in the future without providing the authentication data. The access authorization system also generates access policy data related to an access policy associated with the user. The access policy includes rules that determine whether the access token will be accepted in the future as well as other parameters for granting access to the data management system with the access token data. The access policy data defines an initial relatively short lifetime of the access token data. The access policy indicates that if the user uses the access token data before the initial lifetime has expired, then the lifetime of the access token can be extended. If the user uses the access token data before the most recent lifetime extension of the access token has expired, then the lifetime of the access token data can be extended again. If the access token has expired, or if the user otherwise fails to satisfy access policy rules, then the user will be required to again provide authentication data in order to access the data management system. In this way, the access authorization system, in accordance with principles of the present disclosure, provides access token data whose lifetime can be extended a selected number of times. By providing selectively extendable and acceptable access tokens to users of a data management system based on access policies, the confidence of individuals and organizations in the data management system is increased.

In addition, the disclosed method and system for providing selectively extendable and acceptable access tokens to users of a data management system based on access policies provides for significant improvements to the technical fields of electronic transaction data security, data processing, data management, fraud prevention, fraud detection, and user experience.

In addition, as discussed above, the disclosed method and system for providing selectively extendable and acceptable access tokens to users of a data management system based on access policies provides for the processing and storage of smaller amounts of data related to security systems, i.e., fewer security systems are needed and less effective security measures can be discarded; thereby eliminating unnecessary data analysis and storage. Consequently, using the disclosed method and system for providing selectively extendable and acceptable access tokens to users of a data management system based on access policies results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for providing selectively extendable and acceptable access tokens to users of a data management system based on access policies.

The production environment 100 includes an access authorization system 104, a data management system 106, and a user computing environment 160. The access authorization system 104, the data management system 106, and the user computing environment 160 are coupled together by one or more networks 102 including one or more physical or virtual communication channels, according to one embodiment. The network 102 can include the Internet or other kinds of networks.

In one embodiment, the access authorization system 104 controls access to the data management system 106. The data management system 106 manages secured data stored in a secured data storage and provides data management services related to the secured data.

In one embodiment, the access authorization system 104 controls access to sensitive data and to data management services provided by the data management system 106. To access the sensitive data, the user provides access request data representing a request by the user to access the data management system 106. If the user does not have access token data, then the user must provide authentication data in order to initially access the data management system 106. Once the user has been authenticated as an authorized user of the data management system 106, the access authorization system 104 grants the user access to the data management system 106, which in turn provides the user access to the secured data and the services provided by the data management system 106. Additionally, in order to provide the authenticated user with more convenient access in the future, the access authorization system 104 provides access token data to the user. The access authorization system 104 generates an access policy including rules that govern whether or not the access token data will be accepted as authentication in the future. The access policy specifies an initial lifetime of the access token data as well as conditions for selectively extending the lifetime of the access token data a limited number of times. The access policy also specifies rules that the user must satisfy in addition to the characteristics of the access token data in order to gain access to the data management system 106 with the access token data.

In one embodiment, the access authorization system includes an interface module 113, an access token generation module 114, an access policy module 116, an access policy generation module 118, and an access policy compliance analysis module 120. The data management system 106 includes an interface module 112 of the data management system 106, a data management services module 122, and secured data storage 124. The data management system 106 utilizes these modules and systems to provide secure and efficient access to sensitive data and services.

The interface module 112 of the data management system 106 receives access request data 130 from a user. The access request data 130 represents a request by the user to access the data management services of the data management system 106. The user provides the access request data 130 to the data management system 106 via the user computing environment 160, such as a computing device of the user. When the user provides the access request data 130, the data management system redirects the user to the access authorization system 104. The data management system 106 may pass the access request data 130 to the access authorization system 104, or the data management system 106 may cause the user computing environment 160 to provide the access request data 130 to the access authorization system 104. The interface module 113 of the access authorization system 104 receives the access request data 130, either from the user computing environment directly or from the data management system 106. The access authorization system 104 may require the user to provide authentication data 132 in order to authenticate the identity of the user. The authentication data 132 can include one or more of a user name, an identification number, an account number, a password, answers to one or more security questions, or other types of data that can be used initially authenticate the identity of the user. The authentication data 132 can be provided with the access request data 130. Alternatively, the authentication data 132 can be provided separately from the access request data 130. The interface module 113 of the authorization system 104 receives the authentication data 132.

In one embodiment, the access authorization system 104 checks the authentication data 132 in order to ascertain that the user is an authorized user of the data management system 106. If the user is an authorized user of the data management system 106, then the access authorization system 104 allows the user to access the data and services of the data management system 106.

In one embodiment, the interface module 112 of the data management system 106 of the data management system provides data management services data 136 to the user in response to the user access request data 130. The data management services data 136 can include data or services requested by the user. For example, the user may request to download or view a portion of the secured data 148. The data management services data 136 can include that portion of the secured data 148 that the user has requested. Furthermore, the data management services data 136 can include services provided by the data management system 106 in relation to the secured data 148. For example, the user may request that the data management system 106 generate one or more reports, graphs, documents, or other types of services based on the secured data 148. Thus, the data management services data 136 can include portions of the secured data 148 and services related to portions of the secured data 148.

In some cases, it can become both a nuisance and a security risk for a user to provide the authentication data 132 each time that the user wishes to access the data management system 106. If the user frequently accesses the data management system 106, then the user can become frustrated if the user must provide authentication data 132 each time that the user wishes to access the services of the data management system 106. The repeated transmission of sensitive authentication data 132 represents a security risk in that the authentication data 132 can eventually be intercepted and used by fraudsters to access the data management system 106 in order to obtain sensitive data related to the user or to other users. Furthermore, the user may decide to write authentication data 132 on an easily accessed paper or book, or may store the authentication data 132 in an unsecured file of a computer in order to be able to easily retrieve the authentication data 132 to provide it to the access authorization system 104. The interception of the authentication data 132 can also enable fraudsters to access other institutions with which the user has accounts, if the user has used the same usernames, passwords, answers to security questions, or secret information included in the authentication data 132 with other websites or institutions. Additionally, the authentication data 132 can include government identification numbers, such as a Social Security number, which fraudsters can exploit in many ways to harm the user. Thus, repeated transmission of the authentication data 132 is not only an inconvenience, but a security risk as well.

According to an embodiment, in order to reduce the number of times that the user must transmit the authentication data 132, the access authorization system 104 can provide access token data 134 to the user. The access authorization system 104 provides the access token data via the interface module 113 of the access authorization system 104. The access token data 134 can include a data string that the user can store in the user computing environment 160 and which the user can provide to the data management system 106 with access request data 130 in subsequent attempts to access the data or services of the data management system 106. Thus, in an initial access attempt, the user may provide the authentication data 132. The access authorization system 104 then provides the user with the access token data 134. When the user again provides access request data 130 on subsequent attempts to access the data management system 106, the user provides the access token data 134 with the access request data 130 associated with the subsequent attempts to access the data management system 106. The data management system 106 passes the access token data 134 to access authorization system 104. The access authorization system can authenticate the access token data 134 and can grant the user access to the data management system 106. The user can then gain access to the secured data 148 and to services associated with the secured data 148 provided by the data management system 106. In this way, the user does not have to repeatedly provide authentication data 132 each time the user wishes to access the data management system 106. This is both convenient to the user and reduces security risks associated with frequent transmission of the authentication data 132.

In one embodiment, the access authorization system 104 utilizes the access token generation module 114 in order to generate the access token data 134. The access token data 134 can include private string data 138. The private string data 138 can include one or more private data strings unique to the access token data 134. When the user provides the access token data 134 to the data management system 106 with the access request data 130 in a subsequent access attempt, the data management system 106 provides the access token data 134 to the access authorization system 104. The access authorization system checks to see if the private string data 138 provided by the user matches the private string data 138 initially generated by the access token generation module 114. The access token generation module 114 can utilize encryption and decryption methods to further strengthen the security of the private string data 138 included in the access token data 134.

The utilization of access tokens in order to grant access to the data and services associated with a data management system 106 can also represent a security risk. For example, traditional access authorization systems typically provide access tokens that either never expire, or that have a very long lifetime. These long or indefinite lifetimes of the access tokens can enable fraudsters to eventually obtain and exploit the access tokens in order to fraudulently gain access to a data management system. If a fraudster gains access to sensitive data stored by data management system, the users of the traditional data management system can suffer negative consequences. This can also result in the loss of confidence in traditional data management systems such that users no longer wish to use the traditional data management systems.

In one embodiment, the access authorization system 104 utilizes the access policy module 116 in order to generate robust access policies that reduce the risk associated with the use of the access token data 134 while still providing convenient access to the users. The access policies include rules for accepting the access token data 134 and other portions of the access request data 130 in order to allow the users of the data management system 106 to access the data management system 106 in a secure and efficient manner.

In one embodiment, the access policy module 116 includes access policy data 140. The access policy data 140 includes a plurality of access policies. Each access policy is associated with a respective user of the data management system 106 and defines how the user can utilize the access token data 134 in order to gain access to the data management system 106. A user that provides access request data 130 and access token data 134 that satisfies an access policy will be given access to the secured data 148 or services related to the secured data 148.

In one embodiment, the access policy data 140 includes policy ID data 142. The policy ID data 142 includes identification numbers or codes for each of the various access policies defined by the access policy data 140. When the user requests access to the secured data 148, the user can provide a policy identification number. In particular, the user can provide an access policy number with the access request data 130. The access policy module 116 can match the policy identification number to a policy identified in the policy ID data 142 and can determine under which policy the user seeks to gain access to the data management system 106.

In one embodiment, the access policy data 140 includes policy rules data 144. The policy rules data 144 indicates, for each access policy identified in the policy ID data 142, one or more rules that define what user can gain access to the data management system 106 under that policy. In order to gain access to the secured data 148 under a particular access policy, a user must satisfy the rules for that particular policy as set forth in the policy rules data 144.

In one embodiment, the access policy data 140 provides for the enhanced security of utilization of the access token data 134. In particular, the access policy data 140 can include both an initial lifetime or expiration date of the access token data 134, as well as rules by which the lifetime of the access token data 134 can be extended. The access policy data 140 can determine that the access token data 134 must be used by the user within a defined initial lifetime of the access token data 134 or the access token data 134 will expire and become invalid. The access policy data 140 can define initial lifetimes that are relatively short. For example, the initial lifetime or expiration time of the access token data 134 can be a selected number of weeks, days, hours, or minutes. If the user does not use the access token data 134 to access the data management system 106 within the selected initial lifetime, then the access token data 134 expires and cannot be used to gain access to the services of the data management system. If the user provides the access token data 134 after the access token data has expired, the access authorization system 104 will not accept the access token data 134. The user may be required to provide authentication data 132 in order to again access the data management system 106 if the access token data 134 has expired.

In one embodiment, if the user accesses the data management system 106 by utilizing the access token data 134 within the initial lifetime of the access token data 134, then the access policy module 116 can extend or renew the lifetime of the access token data 134. Thus, the access policy may provide a relatively short initial lifetime, but if the user uses the access token data 134 within the relatively short initial lifetime, then the lifetime of the access token data 134 can be extended. Each time the user provides the access token data 134 to access the data management system 106, the access policy data 140 can indicate that the lifetime of the access token should be extended. In this way, as long as the user uses access token data 134 within the current lifetime of the access token data 134, and if a maximum number of lifetime extensions has not been met, then the lifetime of the access token data 134 can be extended. This provides additional security to the usage of the access token data 134. If the user receives access token data 134 but does not use the access token data, and then months or years later a fraudster obtains the access token data 134, the fraudster cannot use the access token data 134 to access the data management system 106 because the access token data 134 has expired. Thus, the initial short lifetime of the access token data 134, as governed by the access policy data 140, provides for enhanced security in utilizing the access token data 134.

In one embodiment, the policy rules data 144 can include a set number of possible extensions or renewals of the lifetime of the access token data 134. If the user provides the access token data 134 to the data management system 106 during the initial lifetime of the access token data 134, then the access authorization system 104 can renew or extend the lifetime of the access token data 134 for selected period of time, in accordance with the access policy data 140. The extension of the lifetime of the access token data 134 can be for the same length of time as the initial lifetime of the access token data 134. Alternatively, the extension of the lifetime of the access token data 134 can be for a length of time that is different than the initial lifetime of the access token data 134. Each time the user provides the access token data 134 to access the data management system 106 while the access token data 134 is still valid, i.e. as long as the most recent lifetime extension has not expired, the lifetime of the access token data 134 can again be extended or renewed. The lifetime of the access token data 134 can be extended a fixed number of times as specified by the access policy data 140. Because the access policy data 140 limits the number of times that the access token data 134 can be extended, the lifetime of the access token data 134 cannot be extended indefinitely. This severely limits the opportunities for fraudsters to gain access to the access token data 134 and to exploit the access token data 134 for fraudulent purposes.

In one embodiment, renewing the access token data includes providing new access token data 134 to the user. In this case, each time that the access policy module 116 extends the lifetime of the access token data 134, the interface module 112 of the data management system 106 provides revised access token data 134 to the user computing environment 160. The revised access token data 134 can include altered or new private string data 138 or can otherwise be different. Even though the access authorization system 104 provides revised access token data 134 to the user computing environment 160 each time the lifetime of the access token data 134 is extended, the lifetime of the access token data 134 can only be extended a fixed number of times in accordance with the access policy data 140 before the user is again required to provide authentication data 132 in order to again gain access to the data management system 106.

In one embodiment, the policy rules data 144 indicates that the access token data 134 must be received from an IP address that corresponds to an IP address recorded in the policy rules data 144 associated with the user. For example, when the user initially provides access request data 130 and authentication data 132, the data management system 106 records the IP address from which the access request data 130 was received. The policy rules data 144 can require that if the user provides access token data 134 to access the data management system 106, the access token data 134 must be received from an IP address that corresponds to the IP address recorded in the policy rules data 144. If the IP address from which the access token data 134 was received does not correspond to the IP address in the policy rules data 144, then the data management system 106 can deny the access request of the user, thereby preventing the user from accessing the secured data 148 or the other services of the data management system 106. The policy rules data 144 can require that the user provide authentication data 132 again in order to gain access to the data management system 106.

In one embodiment, the policy rules data 144 indicates that the access token data 134 must be received from a computing device system that corresponds to a machine or computing system recorded in the policy rules data 144 associated with the user. For example, when the user initially provides access request data 130 and authentication data 132, the data management system 106 records a device identifier or machine identification, such as a MAC address, a soft identifier that is injected into the computing device, a configuration of the computing device, an operating system of the computing device or other identifier that identifies the computing device or system from which the access request data 130 was received. The policy rules data 144 can require that if the user provides access token data 134 to access the data management system 106, the access token data 134 must be received from a device having a device identifier that corresponds to the device identifier recorded in the policy rules data 144. If the device identifier from which the access token data 134 was received does not correspond to the device identifier in the policy rules data 144, then the access authorization system 104 can deny the access request of the user, thereby preventing the user from accessing the secured data 148 or the other services of the data management system 106. The policy rules data 144 can require that the user again provide authentication data 132 in order to gain access to the data management system 106.

In one embodiment, the policy rules data 144 specifies a particular operating system of a computing device. For example, when the user initially provides access request data 130 and authentication data 132, the access authorization system 104 records an operating system used by the computing device when the computing device most recently provided the authentication data 132. The policy rules data 144 can require that if the user provides access token data 134 to access the data management system 106, the access token data 134 must be received from the same computing device operating on the same operating system as recorded in the policy rules data 144. If the operating system of the computing device from which the access token data 134 was received does not correspond to the operating system in the policy rules data 144, then the access authorization system 104 can deny the access request of the user, thereby preventing the user from accessing the secured data 148 or the other services of the data management system 106. The policy rules data 144 can require that the user again provide authentication data 132 in order to gain access to the data management system 106.

In one embodiment, the policy rules data 144 specifies a particular web browser of a computing device. For example, when the user initially provides access request data 130 and authentication data 132, the access authorization system 104 records a web browser used by the computing device when the computing device provided the access request data 130. The policy rules data 144 can require that if the user provides access token data 134 to access the data management system 106, the access token data 134 must be received from the same computing device utilizing the same web browser as recorded in the policy rules data 144. If the web browser of the computing device from which the access token data 134 was received does not correspond to the web browser in the policy rules data 144, then the access authorization system 104 can deny the access request of the user, thereby preventing the user from accessing the secured data 148 or the other services of the data management system 106. The policy rules data 144 can require that the user again provide authentication data 132 in order to gain access to the data management system 106.

In one embodiment, the policy rules data 144 specifies a particular software application or program utilized by the computing device of the user to provide the access token data 134 with the access request data 130. For example, when the user initially provides access request data 130 and authentication data 132, the access authorization system 104 records a software application or program used by the computing device when the computing device provided the access request data 130. The policy rules data 144 can require that if the user provides access token data 134 to access the data management system 106, the access token data 134 must be received from the same computing device utilizing the same software application or program as recorded in the policy rules data 144. If the software application or program of the computing device from which the access token data 134 was received does not correspond to the software application or program in the policy rules data 144, then the access authorization system 104 can deny the access request of the user, thereby preventing the user from accessing the secured data 148 or the other services of the data management system 106. The policy rules data 144 can require that the user again provide authentication data 132 in order to gain access to the data management system 106.

In one embodiment, the policy rules data 144 includes rules related to previously observed access patterns of the user. In many cases, a particular user will display a particular pattern in accessing the data management system 106. A particular user may establish a pattern of accessing the data management system 106 only on a particular day or particular days of the week. A particular user may access the data management system 106 only at certain times of day. A particular user may access the data management system 106 only from a particular location. The data management system 106 can observe and record the usage patterns of the users and can update the policy rules data 144 to include rules that specify that future access utilizing the access token data 134 must fall within previously identified usage patterns of the user. If an access request utilizing access token data 134 falls outside of the observed usage patterns in the user, then the policy rules data 144 can indicate that the access authorization system 104 should deny the user access to the secured data 148 and the services of the data management system 106. In this way, if a fraudster obtains access token data 134 and attempts to access the data management system 106 on a day or at a time of day that falls outside the established usage pattern of the user, then the access authorization system 104 will deny the access request.

In one embodiment, the policy rules data 144 includes rules related to previously observed access patterns of a large number of users of the data management system 106. Users of the data management system 106 may collectively demonstrate general access patterns for accessing the data management system 106. The policy rules data 144 can include rules that indicate that if in access request is received outside of the general access patterns of the users of the data management system 106, then the access authorization system 104 can deny the access request. If the access request is denied, the access authorization system 104 can require that the user again provide authentication data 132 in order to access the secured data 148 and the other services of the data management system 106.

In one embodiment, the access request data 130 or the access token data 134 includes an access policy identification number that identifies an access policy under which the user seeks to gain access to the secured data 148. The access policy module 116 matches the policy identification number provided in the access request data 130 with a policy identification number stored in the policy ID data 142. The access policy module 116 then retrieves the policy rules associated with the identified policy. The user is granted or denied access to the data management system 106 based on whether or not the access rules associated with that policy are satisfied.

In one embodiment, the access policy module 116 the uses the access policy compliance analysis module 120 to determine if the user satisfies the access policy under which the user seeks to access the secured data 148. When the access policy module 116 has ascertained the access policy under which the user seeks to gain access to the secured data 148, the access policy compliance analysis module 120 analyzes the access request data 130 and the access token data 134 and the policy rules associated with the policy under which the user seeks to access the secured data 148. The rules for the selected policy are included in the policy rules data 144. The access policy compliance analysis module 120 compares the access request data 130 and the access token data 134 to the rules in order to determine if the user is allowed to gain access under the access policy. If the access request data 130 and the access token data 134 satisfy the rules for the access policy, then, in one embodiment, the interface module 112 of the data management system 106 can provide the user access to the secured data 148 and the services of the data management system 106. If the access request data 130 and the access token data 134 does not satisfy the rules for the access policy, then the access authorization system does not grant the user access to the secured data 148 and the services of the data management system 106.

In one embodiment, the access authorization system 104 includes an access policy generation module 118. The access policy generation module 118 can generate the access policy data 140 for the various access policies. In one embodiment, the access policy generation module 118 automatically generates some or all of the access policy data 140. In one embodiment, the access policy generation module 118 enables a privileged user, such as an administrator of the access authorization system 104, to generate new access policies for accessing the data management system 106. The access policy generation module 118 includes access policy generation tool data 146 that provides the functionality for generating new access policies. The access policy generation module 118 can include a user interface that enables the privileged user to select rules for a new access policy.

In one embodiment, the data management system 106 includes a data management services module 122. The data management services module 122 provides data management services data 136 to the users. The data management services data 136 can include portions of the secured data 148 requested by the users. The data management services data 136 can also include data related to other services of the data management system 106. The other services can include analyzing and transforming portions of the secured data 148 into a desired format or document as requested by a user of the data management system 106.

In one embodiment, the access authorization system controls access by users to a data management system such as a financial management system, a social media system, an online personal address book, an email system, an app store at which users purchase software applications for mobile phones, tablets, or other types of computing devices, databases that control sensitive data, or any other type of data management system that manages data.

In one embodiment, the data management system 106 includes one or more electronic financial management systems. The electronic financial management systems can include a tax return preparation system, a budgeting system, a financial transactions monitoring system, a payroll system, an accounting system, a book keeping system or other electronic systems that assist users in managing their finances.

In one embodiment, users utilize the data management system 106 to manage aspects of their finances as set forth above. Users may provide very sensitive financial and personal data to the data management system 106. The data management system 106 may store the personal financial data in the secured data 148. Additionally, the data management system 106 may actively gather financial data related to the users from sources such as banks of the users have accounts, credit card companies, financial institutions, third party computing environments, social media, public computing environments, and other types of computing environments that may contain financial or personal data related to the users of the data management system 106. Users may utilize the services of the data management system 106 in order to prepare an electronic tax return, to complete payroll, to prepare accounting reports, or to perform other financial related services. Thus, the data management system 106 gathers personal and financial data and stores it in the secured data 148. The data management system 106 utilizes the data management services module 122 to provide financial related services to the users such as those noted above. Due to the sensitive nature of data included in the secured data 148, and of the services provided by the data management system 106 related to the secured data 148, the access authorization system 104 implements security protocols such as the access policy data 140 in order to provide enhanced security to the secured data 148 and the services provided by the data management system 106 and to balance the convenience with which the users can access the data management system 106.

In one embodiment, the data management system 106 includes a financial transaction monitoring service that monitors the financial transactions of users and enables users to view their financial related data and to access reports and other types of financial documents generated by the data management system 106 that users may easily ascertain the overall state of their finances and the particulars of how they spend and receive money.

In one embodiment, a particular user accesses the data management system 106 in order to receive financial transaction monitoring services from the data management system 106. The user utilizes a computing device, such as a tablet, a smart phone, a desktop computer, a laptop computer, or other computing device to access the data management system 106. The user types in a URL into a web browser of the computing device in order to access the data management system 106. The data management system 106 receives access request data 130 from the computing device of the user. The data management system redirects the access request data 130 to the access authorization system 104. The access authorization system 104 requires that the user provide authentication data 132 in order to initially access the data management system 106. The user provides the authentication data 132 and is able to access the data management system 106. The user views the portions of the secured data 148 that correspond to the user's financial data. The user also requests various financial reports in order to more clearly view the overall state of the user's finances. The data management system 106 provides data management services data 136 to the user including the desired financial data and services.

In one embodiment, after the user provides authentication data 132, the access token generation module 114 generates access token data 134 representing an access token and provides the access token to the computing device of the user. In one embodiment, the access token is part of a cookie that will be stored in the computing device of the user. The next day, the user again enters the URL corresponding to the data management system 106 into his web browser. The data management system 106 passes the access request data to the access authorization system 104. The access authorization system 104 checks the cookie data on the computing device of the user in order to ascertain whether the user has the access token data 134. The access policy module 116 identifies the policy associated with the user based on the access request data 130 and the policy ID data 142. The access policy module 116 accesses the rules data. The access policy compliance analysis module 120 checks the access request data 130, including the access token data 134, against the policy rules data 144 associated with the access policy of the user. The access policy compliance analysis module 120 determines that the access token data 134 has an initial lifetime of three days and that the user has provided the access token before the end of the three-day lifetime. Thus, the access policy compliance analysis module 120 determines that the access token data 134 complies with the policy rules data 144. The policy rules data 144 indicates that the lifetime of the access token data 134 can be extended three times for one week per extension. The access policy module 116 extends the lifetime of the access token data 134 additional week. The user logs in on the same day of each of the next two weeks in the access token data 134 extended each time. On the third week, the policy rules data 144 indicates that the lifetime of the access token data 134 has been extended the maximum number of times. The access policy module 116 indicates that the user must provide the authentication data 132 again if the user wishes to access the data management system 106 after the end of the lifetime of the final extension of the access token data 134.

In one embodiment, each time the user provides the access token data 134 with the access request data 130, the access policy compliance analysis module 120 checks the access policy rules data 144 to determine that all rules of the access policy, not just whether or not the access token data 134 has expired, before allowing the user to access the data management system 106. Thus, the access policy compliance analysis module 120 checks the IP address associated with the access request data 130, a MAC address of the computing device included in the access request data 130, the day of the week and the time of the day at which the access request data 130 was provided, and the web browser and operating system utilized by the computing device of the user and providing the access request data 130. If all of these parameters satisfy the policy rules data 144, then the access policy compliance analysis module 120 indicates that the user can access the secured data 148 and the other services of the data management system 106. The policy rules data 144 can specify policy rules related to each of the parameters set forth above, to only some of the parameter set forth above, or to an entirely different set of parameters than those set forth above.

In one embodiment, the access authorization system 104 and the data management system 106 are part of a same computing system controlled or operated by a same organization. In one embodiment, the access authorization system 104 is a separate system from the data management system 106. The data management system 106 utilizes the services of the access authorization system 104 to provide secure and efficient access control services to the data management system 106. The access authorization system 104 may include one or more servers separate from the data management system 106. When a user attempts to access the data management system 106, the data management system may redirect the user to the access authorization system 104 until the access authorization system 104 authenticates the user.

As noted above, the specific illustrative examples discussed above are but illustrative examples of implementations of embodiments of the method or process for providing selectively extendable and acceptable access tokens to users of a data management system based on access policies. Those of skill in the art will readily recognize that other implementations and embodiments are possible. Therefore, the discussion above should not be construed as a limitation on the claims provided below.

Process

Figure 2:
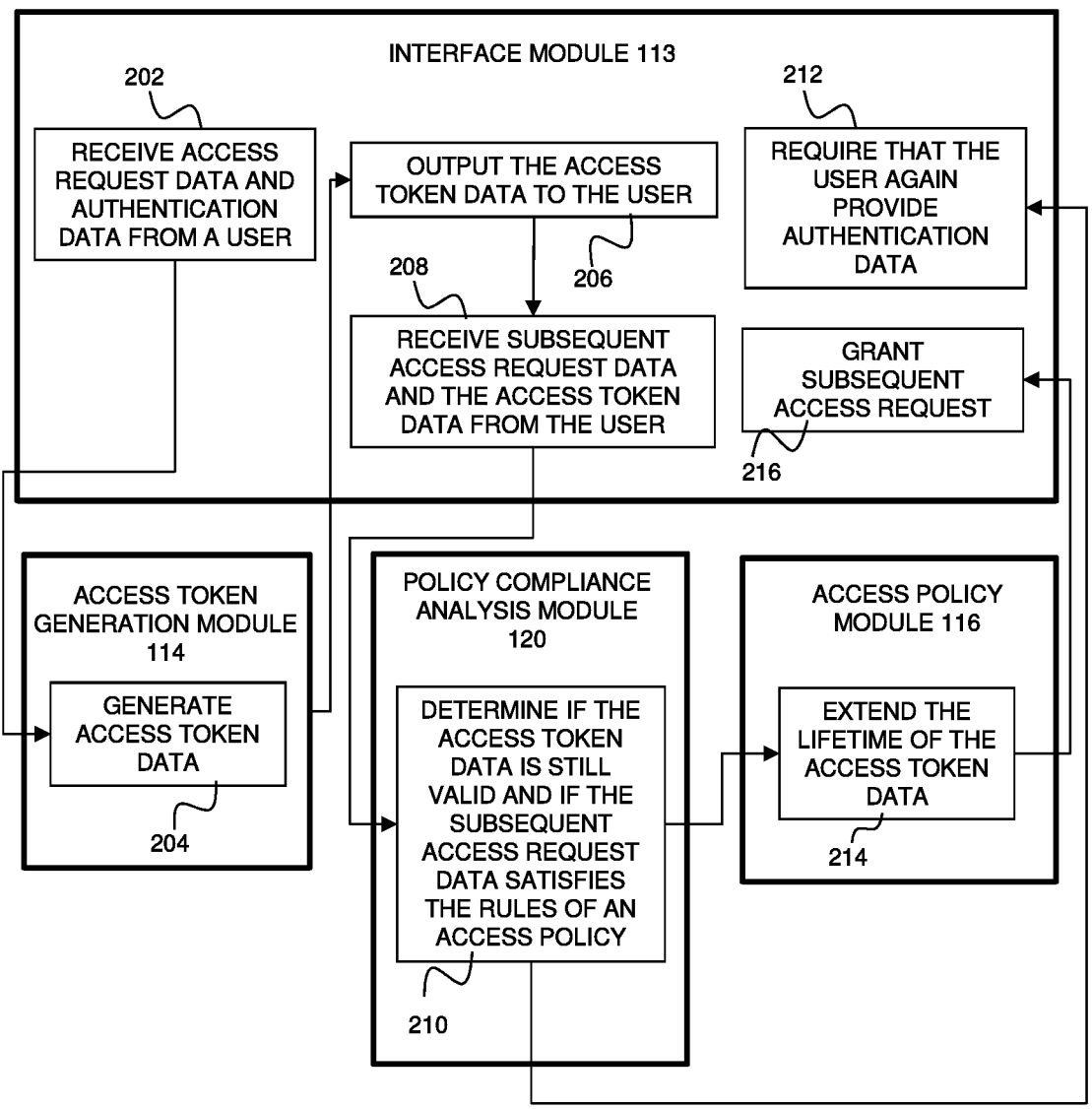
FIG. 2 is a block diagram of a process providing selectively extendable and acceptable access tokens to users of a data management system based on access policies, in accordance with one embodiment.

FIG. 2 illustrates a functional flow diagram of a process 200 for providing selectively extendable and acceptable access tokens to users of a data management system based on access policies, in accordance with one embodiment.

With reference to FIG. 1 and FIG. 2, at block 202, the interface module 113 of the access authorization system 104 receives access request data and authentication data from a user seeking access to secured data protected by a data management system 106, according to one embodiment. From block 202 the process proceeds to block 204.

At block 204, the access token generation module 114 generates access token data, according to one embodiment. From block 204, the process proceeds to block 206.

At block 206, the interface module 113 of the access authorization system 104 outputs access token data to the user, according to one embodiment. From block 206 the process proceeds to block 208.

At block 208, the interface module 113 of the access authorization system 104 receives subsequent access request data and the access token data from the user, or from the data management system 106, according to one embodiment. From block 208, the process proceeds to block 210.

At block 210, the access policy compliance analysis module 120 determines if the access token data is still valid and if the subsequent access request data satisfies the rules of an access policy associated with the access token data, the process proceeds to block 214. If the access token data is not still valid or if the subsequent access request data does not satisfy the rules of the access policy, the process proceeds to block 212.

At block 214, the access policy module 116 extends the lifetime of the access token data. From block 214, the process proceeds to block 216.

At block 216, the interface module 113 of the access authorization system 104 grants the subsequent access request and the user is able to access the secured data of the data management system, according to one embodiment.

If the access policy compliance analysis module 120 determines that the access token data is not still valid, or if the policy compliance analysis module 120 determines that the subsequent access request data does not satisfy the rules of the access policy, then the interface module 113 of the access authorization system 104 requires that the user again provide the authentication data at block 212, according to one embodiment.

Although a particular sequence is described herein for the execution of the process 200, other sequences can also be implemented in accordance with principles of the present disclosure.

Figure 3:
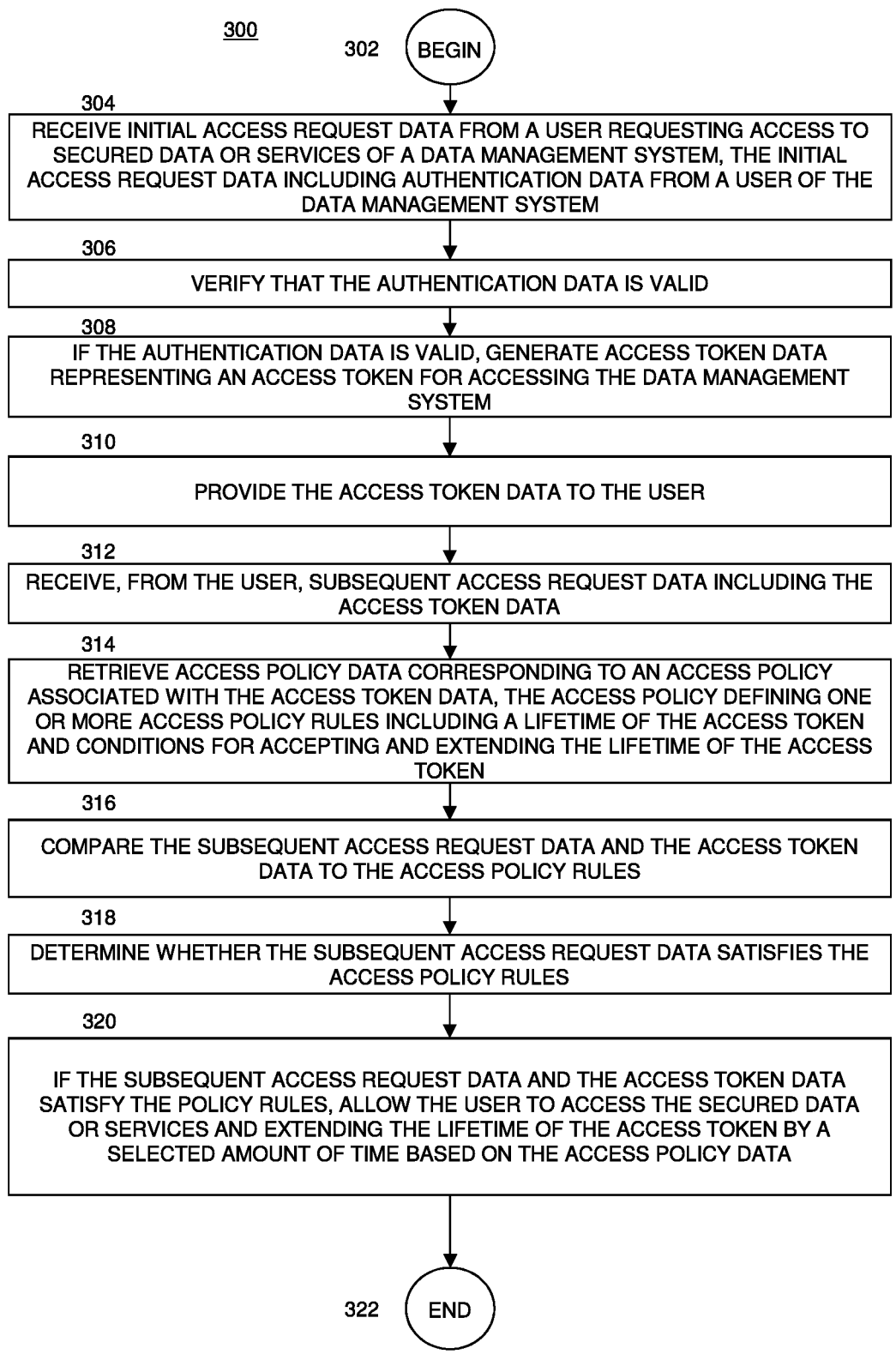
FIG. 3 is a flow diagram of a process providing selectively extendable and acceptable access tokens to users of a data management system based on access policies, in accordance with one embodiment.

FIG. 3 illustrates a flow diagram of a process 300 for providing selectively extendable and acceptable access tokens to users of a data management system based on access policies, according to various embodiments.

In one embodiment, process 300 for providing selectively extendable and acceptable access tokens to users of a data management system based on access policies begins at BEGIN 302 and process flow proceeds to RECEIVE INITIAL ACCESS REQUEST DATA FROM A USER REQUESTING ACCESS TO SECURED DATA OR SERVICES OF A DATA MANAGEMENT SYSTEM, THE INITIAL ACCESS REQUEST DATA INCLUDING AUTHENTICATION DATA FROM A USER OF THE DATA MANAGEMENT SYSTEM 304.

In one embodiment, at RECEIVE INITIAL ACCESS REQUEST DATA FROM A USER REQUESTING ACCESS TO SECURED DATA OR SERVICES OF A DATA MANAGEMENT SYSTEM, THE INITIAL ACCESS REQUEST DATA INCLUDING AUTHENTICATION DATA FROM A USER OF THE DATA MANAGEMENT SYSTEM 304 process 300 for providing selectively extendable and acceptable access tokens to users of a data management system based on access policies receives initial access request data from a user requesting access to secured data or services of a data management system, the initial access request data including authentication data from a user of the data management system.

In one embodiment, once process 300 for providing selectively extendable and acceptable access tokens to users of a data management system based on access policies receives initial access request data from a user requesting access to secured data or services of a data management system, the initial access request data including authentication data from a user of the data management system at RECEIVE INITIAL ACCESS REQUEST DATA FROM A USER REQUESTING ACCESS TO SECURED DATA OR SERVICES OF A DATA MANAGEMENT SYSTEM, THE INITIAL ACCESS REQUEST DATA INCLUDING AUTHENTICATION DATA FROM A USER OF THE DATA MANAGEMENT SYSTEM 304 process flow proceeds to VERIFY THAT THE AUTHENTICATION DATA IS VALID 306.

In one embodiment, at VERIFY THAT THE AUTHENTICATION DATA IS VALID 306, process 300 for providing selectively extendable and acceptable access tokens to users of a data management system based on access policies verifies that the authentication data is valid.

In one embodiment, once process 300 for providing selectively extendable and acceptable access tokens to users of a data management system based on access policies verifies that the authentication data is valid at VERIFY THAT THE AUTHENTICATION DATA IS VALID 306, process flow proceeds to IF THE AUTHENTICATION DATA IS VALID, GENERATE ACCESS TOKEN DATA REPRESENTING AN ACCESS TOKEN FOR ACCESSING THE DATA MANAGEMENT SYSTEM 308.

In one embodiment, at IF THE AUTHENTICATION DATA IS VALID, GENERATE ACCESS TOKEN DATA REPRESENTING AN ACCESS TOKEN FOR ACCESSING THE DATA MANAGEMENT SYSTEM 308, process 300 for providing selectively extendable and acceptable access tokens to users of a data management system based on access policies if the authentication data is valid, generates access token data representing an access token for accessing the data management system.

In one embodiment, once process 300 for providing selectively extendable and acceptable access tokens to users of a data management system based on access policies if the authentication data is valid, generates access token data representing an access token for accessing the data management system at IF THE AUTHENTICATION DATA IS VALID, GENERATE ACCESS TOKEN DATA REPRESENTING AN ACCESS TOKEN FOR ACCESSING THE DATA MANAGEMENT SYSTEM 308, process flow proceeds to PROVIDE THE ACCESS TOKEN DATA TO THE USER 310.

In one embodiment, at PROVIDE THE ACCESS TOKEN DATA TO THE USER 310 the process 300 provides the access token data to the user.

In one embodiment, once process 300 provides the access token data to the user at PROVIDE THE ACCESS TOKEN DATA TO THE USER 310, process flow proceeds to RECEIVE, FROM THE USER, SUBSEQUENT ACCESS REQUEST DATA INCLUDING THE ACCESS TOKEN DATA 312.

In one embodiment, at RECEIVE, FROM THE USER, SUBSEQUENT ACCESS REQUEST DATA INCLUDING THE ACCESS TOKEN DATA 312 the process 300 for providing selectively extendable and acceptable access tokens to users of a data management system based on access policies receives, from the user, subsequent access request data including the access token data.

In one embodiment, once the process 300 for providing selectively extendable and acceptable access tokens to users of a data management system based on access policies receives, from the user, subsequent access request data including the access token data at RECEIVE, FROM THE USER, SUBSEQUENT ACCESS REQUEST DATA INCLUDING THE ACCESS TOKEN DATA 312, process flow proceeds to RETRIEVE ACCESS POLICY DATA CORRESPONDING TO AN ACCESS POLICY ASSOCIATED WITH THE ACCESS TOKEN DATA, THE ACCESS POLICY DEFINING ONE OR MORE ACCESS POLICY RULES INCLUDING A LIFETIME OF THE ACCESS TOKEN AND CONDITIONS FOR ACCEPTING AND EXTENDING THE LIFETIME OF THE ACCESS TOKEN 314.

In one embodiment, at RETRIEVE ACCESS POLICY DATA CORRESPONDING TO AN ACCESS POLICY ASSOCIATED WITH THE ACCESS TOKEN DATA, THE ACCESS POLICY DEFINING ONE OR MORE ACCESS POLICY RULES INCLUDING A LIFETIME OF THE ACCESS TOKEN AND CONDITIONS FOR ACCEPTING AND EXTENDING THE LIFETIME OF THE ACCESS TOKEN 314 the process 300 for providing selectively extendable and acceptable access tokens to users of a data management system based on access policies retrieves access policy data corresponding to an access policy associated with the access token data, the access policy defining one or more access policy rules including a lifetime of the access token and conditions for accepting and extending the lifetime of the access token.

In one embodiment, once the process 300 for providing selectively extendable and acceptable access tokens to users of a data management system based on access policies retrieves access policy data corresponding to an access policy associated with the access token data, the access policy defining one or more access policy rules including a lifetime of the access token and conditions for accepting and extending the lifetime of the access token at RETRIEVE ACCESS POLICY DATA CORRESPONDING TO AN ACCESS POLICY ASSOCIATED WITH THE ACCESS TOKEN DATA, THE ACCESS POLICY DEFINING ONE OR MORE ACCESS POLICY RULES INCLUDING A LIFETIME OF THE ACCESS TOKEN AND CONDITIONS FOR ACCEPTING AND EXTENDING THE LIFETIME OF THE ACCESS TOKEN 314, process flow proceeds to COMPARE THE SUBSEQUENT ACCESS REQUEST DATA AND THE ACCESS TOKEN DATA TO THE ACCESS POLICY RULES 316.

In one embodiment, at COMPARE THE SUBSEQUENT ACCESS REQUEST DATA AND THE ACCESS TOKEN DATA TO THE ACCESS POLICY RULES 316, the process 300 for providing selectively extendable and acceptable access tokens to users of a data management system based on access policies compares the subsequent access request data and the access token data to the access policy rules.

In one embodiment, once the process 300 for providing selectively extendable and acceptable access tokens to users of a data management system based on access policies compares the subsequent access request data and the access token data to the access policy rules at COMPARE THE SUBSEQUENT ACCESS REQUEST DATA AND THE ACCESS TOKEN DATA TO THE ACCESS POLICY RULES 316, process flow proceeds to DETERMINE WHETHER THE SUBSEQUENT ACCESS REQUEST DATA SATISFIES THE ACCESS POLICY RULES 318.

In one embodiment, at DETERMINE WHETHER THE SUBSEQUENT ACCESS REQUEST DATA SATISFIES THE ACCESS POLICY RULES 318 the process 300 for providing selectively extendable and acceptable access tokens to users of a data management system based on access policies determines whether the subsequent access request data satisfies the access policy rules.

In one embodiment, once the process 300 for providing selectively extendable and acceptable access tokens to users of a data management system based on access policies determines whether the subsequent access request data satisfies the access policy rules at DETERMINE WHETHER THE SUBSEQUENT ACCESS REQUEST DATA SATISFIES THE ACCESS POLICY RULES 318, process flow proceeds to IF THE SUBSEQUENT ACCESS REQUEST DATA AND THE ACCESS TOKEN DATA SATISFY THE POLICY RULES, ALLOW THE USER TO ACCESS THE SECURED DATA OR SERVICES AND EXTENDING THE LIFETIME OF THE ACCESS TOKEN BY A SELECTED AMOUNT OF TIME BASED ON THE ACCESS POLICY DATA 320.

In one embodiment, at IF THE SUBSEQUENT ACCESS REQUEST DATA AND THE ACCESS TOKEN DATA SATISFY THE POLICY RULES, ALLOW THE USER TO ACCESS THE SECURED DATA OR SERVICES AND EXTENDING THE LIFETIME OF THE ACCESS TOKEN BY A SELECTED AMOUNT OF TIME BASED ON THE ACCESS POLICY DATA 320 the process 300 for providing selectively extendable and acceptable access tokens to users of a data management system based on access policies, if the subsequent access request data and the access token data satisfy the policy rules, allows the user to access the secured data or services and extending the lifetime of the access token by a selected amount of time based on the access policy data.

In one embodiment, once the process 300 for providing selectively extendable and acceptable access tokens to users of a data management system based on access policies, if the subsequent access request data and the access token data satisfy the policy rules, allows the user to access the secured data or services and extending the lifetime of the access token by a selected amount of time based on the access policy data at IF THE SUBSEQUENT ACCESS REQUEST DATA AND THE ACCESS TOKEN DATA SATISFY THE POLICY RULES, ALLOW THE USER TO ACCESS THE SECURED DATA OR SERVICES AND EXTENDING THE LIFETIME OF THE ACCESS TOKEN BY A SELECTED AMOUNT OF TIME BASED ON THE ACCESS POLICY DATA 320, process flow proceeds to END 322.

Figure 4:
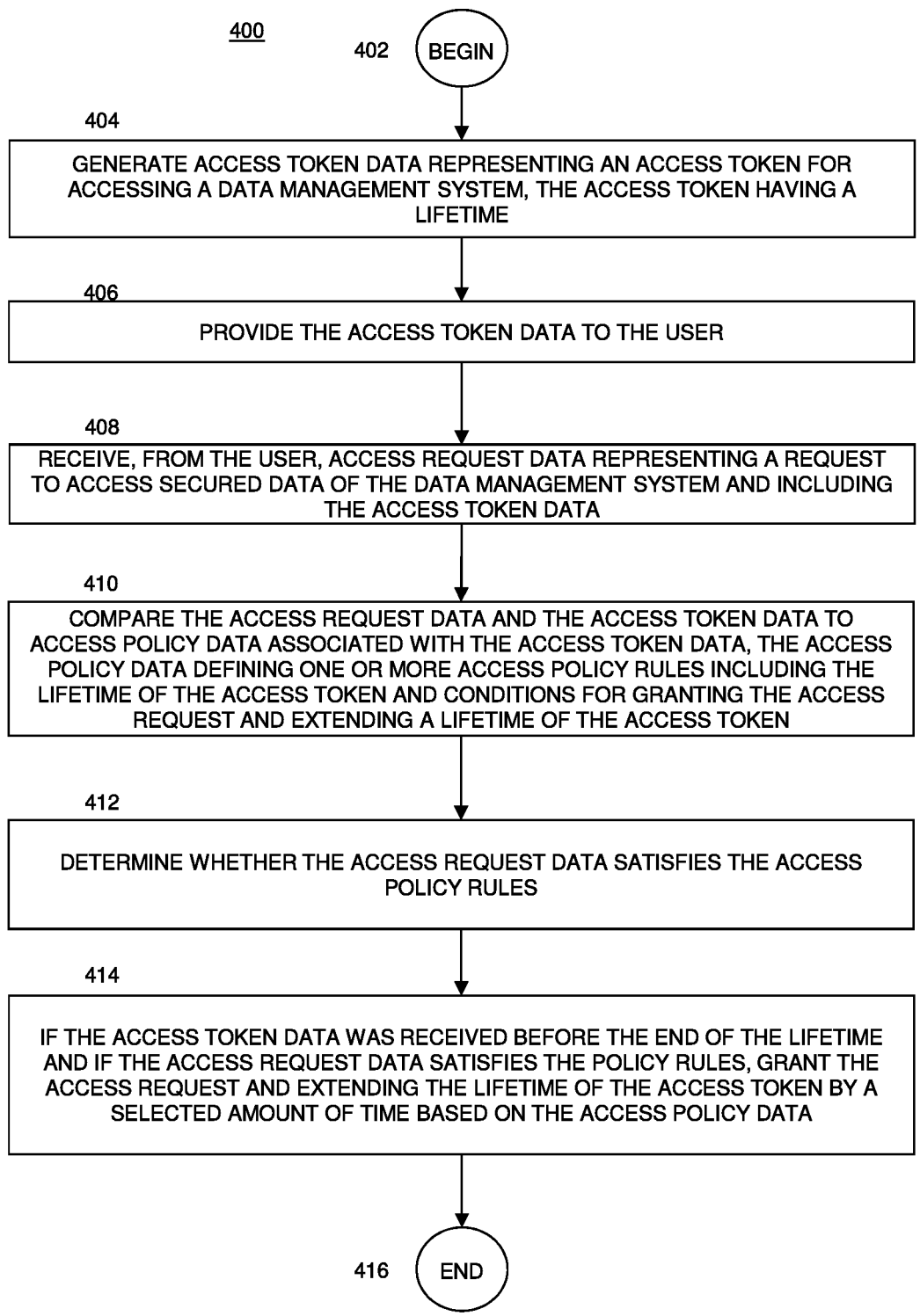
FIG. 4 is a flow diagram of a process providing selectively extendable and acceptable access tokens to users of a data management system based on access policies, in accordance with one embodiment.

FIG. 4 illustrates a flow diagram of a process 400 for providing selectively extendable and acceptable access tokens to users of a data management system based on access policies, according to various embodiments.

In one embodiment, process 400 for providing selectively extendable and acceptable access tokens to users of a data management system based on access policies begins at BEGIN 402 and process flow proceeds to GENERATE ACCESS TOKEN DATA REPRESENTING AN ACCESS TOKEN FOR ACCESSING A DATA MANAGEMENT SYSTEM, THE ACCESS TOKEN HAVING A LIFETIME 404.

In one embodiment, at GENERATE ACCESS TOKEN DATA REPRESENTING AN ACCESS TOKEN FOR ACCESSING A DATA MANAGEMENT SYSTEM, THE ACCESS TOKEN HAVING A LIFETIME 404 process 400 for providing selectively extendable and acceptable access tokens to users of a data management system based on access policies generates access token data representing an access token for accessing a data management system, the access token having a lifetime.

In one embodiment, once process 400 for providing selectively extendable and acceptable access tokens to users of a data management system based on access policies generates access token data representing an access token for accessing a data management system, the access token having a lifetime at GENERATE ACCESS TOKEN DATA REPRESENTING AN ACCESS TOKEN FOR ACCESSING A DATA MANAGEMENT SYSTEM, THE ACCESS TOKEN HAVING A LIFETIME 404 process flow proceeds to PROVIDE THE ACCESS TOKEN DATA TO THE USER 406.

In one embodiment, at PROVIDE THE ACCESS TOKEN DATA TO THE USER 406, process 400 for providing selectively extendable and acceptable access tokens to users of a data management system based on access policies provides the access token data to the user.

In one embodiment, once process 400 for providing selectively extendable and acceptable access tokens to users of a data management system based on access policies provides the access token data to the user at PROVIDE THE ACCESS TOKEN DATA TO THE USER 406, process flow proceeds to RECEIVE, FROM THE USER, ACCESS REQUEST DATA REPRESENTING A REQUEST TO ACCESS SECURED DATA OF THE DATA MANAGEMENT SYSTEM AND INCLUDING THE ACCESS TOKEN DATA 408.

In one embodiment, at RECEIVE, FROM THE USER, ACCESS REQUEST DATA REPRESENTING A REQUEST TO ACCESS SECURED DATA OF THE DATA MANAGEMENT SYSTEM AND INCLUDING THE ACCESS TOKEN DATA 408, process 400 for providing selectively extendable and acceptable access tokens to users of a data management system based on access policies receives, from the user, access request data representing a request to access secured data of the data management system and including the access token data.

In one embodiment, once process 400 for providing selectively extendable and acceptable access tokens to users of a data management system based on access policies receives, from the user, access request data representing a request to access secured data of the data management system and including the access token data at RECEIVE, FROM THE USER, ACCESS REQUEST DATA REPRESENTING A REQUEST TO ACCESS SECURED DATA OF THE DATA MANAGEMENT SYSTEM AND INCLUDING THE ACCESS TOKEN DATA 408, process flow proceeds to COMPARE THE ACCESS REQUEST DATA AND THE ACCESS TOKEN DATA TO ACCESS POLICY DATA ASSOCIATED WITH THE ACCESS TOKEN DATA, THE ACCESS POLICY DATA DEFINING ONE OR MORE ACCESS POLICY RULES INCLUDING THE LIFETIME OF THE ACCESS TOKEN AND CONDITIONS FOR GRANTING THE ACCESS REQUEST AND EXTENDING A LIFETIME OF THE ACCESS TOKEN 410.

In one embodiment, at COMPARE THE ACCESS REQUEST DATA AND THE ACCESS TOKEN DATA TO ACCESS POLICY DATA ASSOCIATED WITH THE ACCESS TOKEN DATA, THE ACCESS POLICY DATA DEFINING ONE OR MORE ACCESS POLICY RULES INCLUDING THE LIFETIME OF THE ACCESS TOKEN AND CONDITIONS FOR GRANTING THE ACCESS REQUEST AND EXTENDING A LIFETIME OF THE ACCESS TOKEN 410 the process 400 for providing selectively extendable and acceptable access tokens to users of a data management system based on access policies compares the access request data and the access token data to access policy data associated with the access token data, the access policy data defining one or more access policy rules including the lifetime of the access token and conditions for granting the access request and extending a lifetime of the access token.

In one embodiment, once process 400 for providing selectively extendable and acceptable access tokens to users of a data management system based on access policies compares the access request data and the access token data to access policy data associated with the access token data, the access policy data defining one or more access policy rules including the lifetime of the access token and conditions for granting the access request and extending a lifetime of the access token at COMPARE THE ACCESS REQUEST DATA AND THE ACCESS TOKEN DATA TO ACCESS POLICY DATA ASSOCIATED WITH THE ACCESS TOKEN DATA, THE ACCESS POLICY DATA DEFINING ONE OR MORE ACCESS POLICY RULES INCLUDING THE LIFETIME OF THE ACCESS TOKEN AND CONDITIONS FOR GRANTING THE ACCESS REQUEST AND EXTENDING A LIFETIME OF THE ACCESS TOKEN 410, process flow proceeds to DETERMINE WHETHER THE ACCESS REQUEST DATA SATISFIES THE ACCESS POLICY RULES 412.

In one embodiment, at DETERMINE WHETHER THE ACCESS REQUEST DATA SATISFIES THE ACCESS POLICY RULES 412 the process 400 for providing selectively extendable and acceptable access tokens to users of a data management system based on access policies determines whether the access request data satisfies the access policy rules.

In one embodiment, once the process 400 for providing selectively extendable and acceptable access tokens to users of a data management system based on access policies determines whether the access request data satisfies the access policy rules at DETERMINE WHETHER THE ACCESS REQUEST DATA SATISFIES THE ACCESS POLICY RULES 412, process flow proceeds to IF THE ACCESS TOKEN DATA WAS RECEIVED BEFORE THE END OF THE LIFETIME AND IF THE ACCESS REQUEST DATA SATISFIES THE POLICY RULES, GRANT THE ACCESS REQUEST AND EXTENDING THE LIFETIME OF THE ACCESS TOKEN BY A SELECTED AMOUNT OF TIME BASED ON THE ACCESS POLICY DATA 414.

In one embodiment, at IF THE ACCESS TOKEN DATA WAS RECEIVED BEFORE THE END OF THE LIFETIME AND IF THE ACCESS REQUEST DATA SATISFIES THE POLICY RULES, GRANT THE ACCESS REQUEST AND EXTENDING THE LIFETIME OF THE ACCESS TOKEN BY A SELECTED AMOUNT OF TIME BASED ON THE ACCESS POLICY DATA 414 the process 400 for providing selectively extendable and acceptable access tokens to users of a data management system based on access policies, if the access token data was received before the end of the lifetime and if the access request data satisfies the policy rules, grants the access request and extending the lifetime of the access token by a selected amount of time based on the access policy data.

In one embodiment, once the process 400 for providing selectively extendable and acceptable access tokens to users of a data management system based on access policies, if the access token data was received before the end of the lifetime and if the access request data satisfies the policy rules, grants the access request and extending the lifetime of the access token by a selected amount of time based on the access policy data at IF THE ACCESS TOKEN DATA WAS RECEIVED BEFORE THE END OF THE LIFETIME AND IF THE ACCESS REQUEST DATA SATISFIES THE POLICY RULES, GRANT THE ACCESS REQUEST AND EXTENDING THE LIFETIME OF THE ACCESS TOKEN BY A SELECTED AMOUNT OF TIME BASED ON THE ACCESS POLICY DATA 414, process flow proceeds to END 416.

In one embodiment, a computing system implemented method for providing selectively extendable and acceptable access tokens to users of a data management system based on access policies includes receiving initial access request data from a user requesting access to secured data or services of a data management system. The initial access request data including authentication data from a user of the data management system verifying that the authentication data is valid. The method includes if the authentication data is valid, generating access token data representing an access token for accessing the data management system, providing the access token data to the user, and receiving, from the user, subsequent access request data including the access token data. The method also includes retrieving access policy data corresponding to an access policy associated with the access token data, the access policy defining one or more access policy rules including a lifetime of the access token and conditions for accepting and extending the lifetime of the access token, comparing the subsequent access request data and the access token data to the access policy rules, and determining whether the subsequent access request data satisfies the access policy rules. The method also includes if the subsequent access request data and the access token data satisfy the policy rules, allowing the user to access the secured data or services and extending the lifetime of the access token by a selected amount of time based on the access policy data.

In one embodiment, a non-transitory computer-readable medium has a plurality of computer-executable instructions which, when executed by a processor, performs a method for providing selectively extendable and acceptable access tokens to users of a data management system based on access policies. The instructions include an access token generation module configured to generate access token data representing an access token for obtaining access to a data management system. The access token has an initial lifetime. The instructions also include an interface module configured to provide the access token data to a user of the data management system and to receive access request data including the access token data from the user. The access request data corresponds to a request by the user to access secured data or services of the data management system. The instructions also include an access policy module configured to store access policy data related to an access policy for determining whether the access request should be granted without requiring the user to provide authentication data. The access policy data includes access policy rules. The access policy rules specify a lifetime of the access token data and a number of times that the lifetime of the access token data can be extended if the access token data is provided by the user while the access token lifetime has not yet expired. The instructions include an access policy compliance analysis module configured to compare the access request data and the access token data to the access policy rules to determine if the access token data is valid and if the access request data satisfies the access policy rules. The interface module is configured to grant the access request if the access request data and the access token data satisfy the access policy rules. The interface module is configured to require that the user provide the authentication data if the access policy rules are not satisfied.

In one embodiment, a system for providing selectively extendable and acceptable access tokens to users of a data management system based on access policies includes at least one processor and at least one memory coupled to the at least one processor. The at least one memory has stored therein instructions which, when executed by any set of the one or more processors, performs a process. The process includes generating access token data representing an access token for accessing a data management system. The access token has a lifetime. The process also includes providing the access token data to the user, receiving, from the user, access request data representing a request to access secured data of the data management system and including the access token data. The process also includes comparing the access request data and the access token data to access policy data associated with the access token data. The access policy data defining one or more access policy rules including the lifetime of the access token and conditions for granting the access request and extending a lifetime of the access token. The process also includes determining whether the access request data satisfies the access policy rules and, if the access token data was received before the end of the lifetime, and if the access request data satisfies the policy rules, granting the access request and extending the lifetime of the access token by a selected amount of time based on the access policy data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can be a general-purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for dynamically updating a system access policy, the method performed by one or more processors of a system and comprising:
   receiving, from a system user, authentication information and an access request to access the system, wherein the system manages finances for the system user;
   in response to receiving the access request, verifying that the authentication information is valid based on a system access policy;
   generating an access token for the system user based on the verifying;
   identifying an access pattern associated with the system user based on at least one of a time of receiving the access request, a day of receiving the access request, or a location of the system user when the access request is received;
   updating, based on the identified access pattern, the system access policy to refrain from accepting or extending a lifetime of the access token if circumstances of receiving a future access request associated with the access token fall outside of the identified access pattern, the circumstances relating to at least one of a time of receiving the future access request, a day of receiving the future access request, or a location of the system user when the future access request is received;
   receiving a subsequent access request associated with the access token;
   determining that the subsequent access request complies with the identified access pattern; and
   in response to the determining, accepting or extending a lifetime of the access token and granting the system user access to the system.

2. The method of claim 1, wherein the system access policy indicates that the access token will be denied if the system user does not use the access token within an initial timeframe.

3. The method of claim 1, further comprising:
   requiring the system user to again provide the authentication information if the access token is denied.

4. The method of claim 1, further comprising:
   requiring the system user to again provide the authentication information in response to determining that a second subsequent access request does not comply with the identified access pattern.

5. The method of claim 1, wherein the system access policy indicates that an IP address associated with the subsequent access request must match an IP address associated with the identified access pattern.

6. The method of claim 1, wherein the system access policy indicates that a computing device identifier associated with the subsequent access request must match a computing device identifier associated with the identified access pattern.

7. The method of claim 6, wherein the computing device identifier includes at least one of a MAC address, a machine identification number, a soft identifier, an operating system, or a machine configuration.

8. The method of claim 1, further comprising:
   denying the subsequent access request if the subsequent access request fails to match the identified access pattern.

9. The method of claim 1, wherein the lifetime of the access token is less than 2 weeks.

10. The method of claim 1, wherein the lifetime of the access token is less than 1 week.

11. The method of claim 1, wherein the lifetime of the access token is less than 4 days.

12. The method of claim 1, wherein the lifetime of the access token is less than 1 day.

13. The method of claim 1, wherein the lifetime of the access token is less than 1 hour.

14. The method of claim 1, wherein the system is a financial management system.

15. The method of claim 1, wherein the system includes financial data of the user.

16. The method of claim 1, wherein the authentication information includes at least one of a user name, a password, an answer to a security question, an identification number, a one-time pin via email or text message, a retinal scan, a fingerprint scan, a thumbprint scan, or a facial scan of the system user.

17. The method of claim 1, wherein the access token is stored in one or more of a cookie, a system database, or a memory of a computing device of the system user.

18. The method of claim 1, wherein extending the lifetime of the access token includes altering the access token.

* * * * *